United States Patent Office
3,539,536
Patented Nov. 10, 1970

3,539,536
FLAME RESISTANT POLYURETHANE COMPOSITIONS FROM BIS-(HYDROXYPOLYALKOXYALKYL)AMINOMETHYLPHOSPHONATES
Glenn R. Price, Dobbs Ferry, N.Y., assignor to Stauffer Chemical Company, New York, N.Y., a corporation of Delaware
No Drawing. Original application Oct. 23, 1965, Ser. No. 504,245, now Patent No. 3,457,333, dated July 22, 1969. Divided and this application July 24, 1968, Ser. No. 760,376
Int. Cl. C08g 22/14
U.S. Cl. 260—77.5                3 Claims

ABSTRACT OF THE DISCLOSURE

Flame resistant polymers comprising an organic isocyanate and a novel bis-(hydroxypolyalkoxyalkyl) aminomethylphosphonate of the general formula:

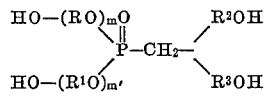

wherein R and $R^1$ are selected from the group consisting of ethylene and substituted ethylene, said substituents selected from alkyl and haloalkyl, $R^2$ and $R^3$ are lower alkylene and $m$, $m^1$ are integers from 1 to 10.

---

This application is a division of application No. 504,245 filed Oct. 23, 1965, now U.S. Pat. No. 3,457,333.

This invention relates to organophosphorus compounds and to certain copolymers which may be made therefrom, more particularly to a novel group of bis-(hydroxypolyalkoxyalkyl) aminomethylphoephonates which when reacted with organic polyisocyanates form polymeric compositions which are highly flame resistant.

The preparation of polyurethanes involves reacting one or more polyols (i.e. compounds containing a reactive hydrogen) with an excess of organic polyisocyanate, usually toluene diisocyanate. To produce an expanded or foamed product, a blowing agent is incorporated into the reaction mixture which causes the expansion of the polymer. These foamed products which have many applications such as insulators and fillers are unfortunately often highly flammable and thus unfit for many thermal applications. Various additives have been mixed with the foams to render them flame-resistant, but they commonly leach out, thus restoring the foam to its original untreated condition.

I have now discovered a novel group of flame-resistant organophosphorus compounds which may be incorporated in a polyurethane foam to provide a permanently bound flame retardant. It is accordingly the primary object of this invention to provide these novel phosphorus compounds, a process of their preparation, and the flame resistant foams containing said compounds. Other objects will be apparent from the detailed description which follows.

The novel phosphorus containing compounds which I have discovered may be represented by the general formula

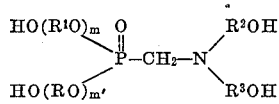

wherein R and $R^1$ are selected from the group consisting of ethylene and substituted ethylene, said substituents selected from alkyl and haloalkyl, $R^2$ and $R^3$ are alkylene and $m$ and $m'$ are integers of from 1 to 10 the total of which is at least 3.

Specific examples of compounds within the ambit of the above formula include the following:

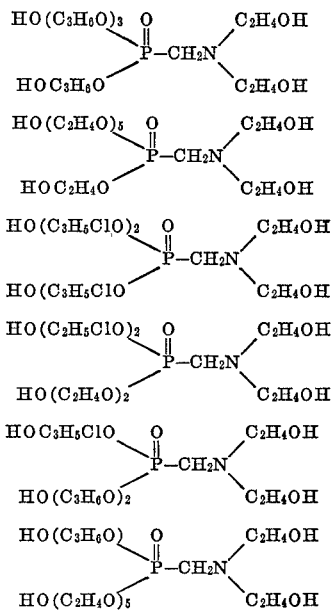

The preparation of these new compounds may be illustrated by the following general reactions:

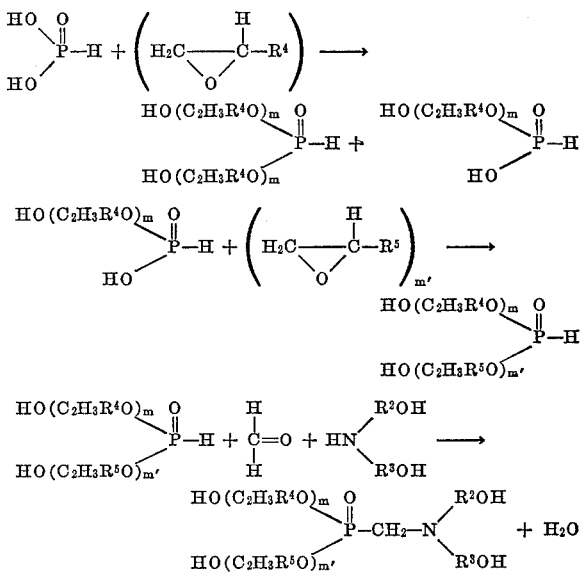

wherein $R^2$, $R^3$, $m$ and $m'$ are as previously defined, and $R^4$ and $R^5$ are selected from the group consisting of hydrogen, alkyl and haloalkyl.

Briefly described, the reactions involve first condensing phosphorous acid with the same or different halo substituted and unsubstituted 1,2-epoxyalkanes, then reacting the resultant phosphonate intermediate with formaldehyde and a dialkanolamine to produce the novel organophosphonate.

Examples of suitable 1,2-epoxyalkanes include ethylene oxide, 1,2-epoxy propane, epichlorohydrin (1 chloro-2, 3-epoxypropane) 1,2-epoxybutane, 1,2-epoxyoctane, 1,2-epoxydecane, etc. Suitable amines would include 2,2'-imino-diethanol 2,2'-imino-2-dipropanol, 6,6'-imino-1-dihexanol etc.

A working temperature range for the reaction is from 0° to 100° C., preferably 25° to 70° C., but temperature is not a critical part of the invention. To ensure completion of the reaction, it is desirable, after addition of the reactants, to heat the reaction mixture for approximately one hour, preferably at a temperature from about 50° C. to about 70° C. One important feature of the invention is that one may control the halogen content in the aminophosphonate product by varying the ratio of epoxy alkane to halo-epoxy alkane in the preparation of the intermediate phosphonate. Thus one may produce compounds having a high Cl:P ratio by merely reacting a chloro-substituted epoxy alkane as the epoxy compound and conversely compounds containing no chlorine are produced by reacting an unsubstituted epoxy alkane with the phosphorous acid.

Another feature of the invention is that the high hydroxyl content of the novel aminophosphonates makes it possible to produce high molecular weight polyurethanes. Moreover, the noval compounds by serving as polymer chain extenders will not migrate of leach out of the foam.

The novel compounds may be used as the sole polyol or mixed with other polyols in the preparation of the polyurethane.

The following examples will serve to illustrate the invention but should not be construed as limiting examples for various modifications and variations within the true scope thereof will be apparent to one skilled in this art.

EXAMPLE 1

Preparation of bis-(hydroxypolyethoxyethyl)-N,N-diethanolaminomethylphosphonate

To a one liter, three-necked reaction flask fitted with a thermometer, stirrer and input tube were added 32.8 grams (0.40 mole) of phosphorous acid and ethylene oxide at temperatures up to 70° C. The ethylene oxide was added until the temperature of the exothermic reaction began to decrease, indicating that most of the phosphorous acid was reacted. The flask was then maintained at 70° C. while a slow stream of ethylene oxide was passed through the reaction mixture for an additional hour to ensure that reaction was complete. The reaction mixture was concentrated at 70° C. and 1.0 mm. Hg to yield 147.0 grams of bis-(hydroxypolyethoxyethyl) phosphonate. In a separate one liter flask fitted with a thermometer and stirrer and containing 42.1 grams (0.40 mole) of diethanolamine was added 46.0 grams (0.46 grams (0.40 mole) of 40% aqueous formaldehyde while maintaining the temperature of the reaction at between 20-30° C. The reaction mixture was stirred for an additional hour after the addition was complete before the mixture was added to the phosphorous acid-ethylene oxide reaction product dropwise while maintaining the temperature between 25° and 50° C. All of the above reactions, being exothermic, were controlled by water cooling. After the last addition was complete, the reaction mixture was further stirred at room temperature for one hour, then heated to 70° C. for one hour. Finally, the mixture was concentrated at 70° C. and 1.0 mm. Hg to give 188.0 grams of bis-(hydroxypolyethoxyethyl)-N,N-diethanolamino methylphosphonate having an analysis of 6.3% P and a hydroxyl equivalent weight of 120.

EXAMPLE 2

Preparation of bis-(hydroxypolypropoxypropyl)-N,N-diethanolaminomethylphosphonate To a one liter, three-necked reaction flask fitted with a thermometer, stirrer and input tube, and containing 32.8 grams (0.4 mole) of phosphorous acid was added 1,2-epoxypropane at temperatures up to 70° until the temperature of the exothermic reaction began to decrease, indicating that most of the phosphorous acid was reacted. An excess (15%) of 1,2-epoxy propane was added and the mixture was heated to 65° C. for one hour before it was concentrated at 70° C. and 1.0 mm. Hg. In a separate reaction flask fitted with a thermometer and stirrer and containing 42.1 grams (0.40 mole) of diethanolamine was added 46.0 grams (0.40 mole) of 40% aqueous formaldehyde while maintaining the temperature of the mixture within the range of 20–30° C. When the addition was complete, the epoxypropane-phosphorous acid reaction product was added over a one hour period while maintaining the temperature within the range of 25–50° C. All of the above reactions being exothermic, were controlled by water cooling. After the addition was complete, the reaction mixture was further stirred at room temperature for one hour and then heated to 70° C. for one hour. The mixture was then concentrated at 70° C. and 1.0 mm. Hg to give 188.0 grams of bis-(hydroxypolypropoxypropyl)-N,N - diethanelaminomethylphosphonate having an analysis of 7.1% P. and a hydroxyl equivalent weight of 110.

EXAMPLE 3

Preparation of bis-(hydroxypolychloropropoxychloropropyl)-N,N-diethanolaminomethylphosphonate To a one liter three-necked reaction flask, fitted with a thermometer, stirrer and input tube and containing 82.0 grams (1.0 mole) of phosphorous acid was added epichlorohydrin (1-chloro-2,3-epoxy propane) dropwise at temperatures up to 50° C. The epichlorohydrin was added until the temperature of the exothermic reaction began to decrease, indicating that most of the phosphorous acid was reacted. An excess (15%) of epichlorohydrin was added to the mixture and the temperature was maintained at 70° C. to ensure that the reaction was complete. The mixture was then concentrated at 70° C. and 1.0 mm. Hg to yield 370.0 grams of bis-(hydroxypolychloropropoxy)phosphonate. In a separate one liter flask fitted with a thermometer and stirrer and containing 31.6 grams (0.3 mole of diethanol amine was added 34.5 grams (0.3 mole) of 40% aqueous formaldehyde while maintaining the temperature of the reaction within the range of 20–30° C. The reaction mixture was stirred for an additional hour after the addition was complete and the mixture was added to 0.3 mole of the epichloro-hydrin-phosphorous acid reaction product previously described. This reaction mixture was heated to 70° C. for one hour and then concentrated at 70° C. and 1.0 mm. Hg to yield 370 grams of bis-(hydroxypolychloropropoxychloropropyl)-N,N-diethanolamino methylphosphonate having an analysis of 6.1% P and 16.7% Cl and a hydroxyl equivalent weight of 120.

Several examples follow which further illustrate the method of making the novel phosphonates in which different epoxy alkanes are used in the synthesis. These content in the final product.

EXAMPLE 4

Preparation of hydroxypolychloropropoxychloropropyl hydroxypolypropoxypropyl-N,N-diethanolamino methylphosphonate To a one liter three-necked reaction flask fitted with a thermometer, stirrer and input tube and containing 295.0 grams (2.5 moles) of phosphorous acid was added dropwise 495 grams (4.38 moles) of epichlorohydrin (1-chloro-2,3-epoxy propane). This addition was carried out over a two hour period while maintaining the temperature below 70° C. The mixture was heated for an additional hour to ensure that all the epoxy alkane was reacted. 1,2-epoxypropane was then added dropwise to the reaction mixture for two hours at temperatures up to 70° C. until a decrease in the temperature indicated that most of the phosphorous acid-epichlorohydrin reaction product was saturated with 1,2-epoxypropane. A 15% excess of 1,2-epoxypropane was added and the reaction mixture maintained at 65° for one hour to ensure completion of the reaction. The mixture was then concentrated at 65° C. and 1.0 mm. Hg to yield 875.0 grams of hydroxychloropropoxychloropropyl hydroxypolypropoxypropyl phosphonate having an analysis of 8.9% P and 17.8% Cl. In a separate flask fitted with a thermometer and stirrer and containing 126.3 grams (1.2 moles) of diethanolamine was added 138.0 grams (1.2 moles) of 40% aqueous formaldehyde while maintaining the temperature of the reaction below 52° C. This addition required one hour. The reaction mixture was then stirred for one hour while maintaining the temperature of the reaction at 50° C. and 420 grams (1.2 moles) of the phosphonate prepared above was added over a one hour period at temperatures up to 60° C. After the addition was complete, the reaction mixture was concentrated at a temperature of 70° C. and 1.0 mm. Hg to yield 551.3 grams of hydroxypolychloropropoxychloropropyl hydroxypolypropoxypropyl-N,N-diethanolamino methylphosphonate, having an analysis of 13.5% Cl., 6.7% P, and a hydroxyl equivalent weight of 115.

EXAMPLE 5

Preparation of hydroxypolypropoxypropyl hydroxypolychloropropoxychloropropyl-N,N-diethanolamino methylphosphonate To a one liter three-necked reaction flask fitted with a thermometer, stirrer and input tube and containing 295.0 grams (2.5 moles) of phosphorous acid was added 202.0 grams (2.2 moles) of epichlorohydrin (1-chloro-2, 3-epoxy propane) dropwise below 70° C. over a one hour period. The reaction mixture was held at 70° C. for one hour after the addition was complete and then treated with 1,2-epoxypropane at temperatures up to 70° C. 1,2-epoxypropane was added until the reaction appeared to be no longer exothermic plus a 50.0 gram excess. The reaction mixture was maintained at 60° C. for 2.0 hours before concentrating at 65° C. and 1.0 mm. of Hg to yield 847 g. of product analyzing as 9.1% P and 9.1% Cl. To 116.0 g. (1.1 moles) of diethanol amine in a separate flask was added 83.0 ml. (1.1 moles) of 40% aqueous formaldehyde at temperatures up to 30° C. The reaction mixture was heated to 50° C. for one hour after the addition was complete and then concentrated at 50° C. and 1.0 mm. of Hg. This product was treated with 374.0 g. (1.1 moles based on $H_3PO_3$) of the intermediate product prepared above from phosphorous acid, epichlorohydrin and 1,2-epoxypropane. The addition was carried out over a one hour period at temperatures up to 70° C. After the addition was complete, the reaction mixture was heated at 70° for one hour and then concentrated at 70° C. and 1.0 mm. of Hg to yield 496.2 g. of hydroxypolypropoxypropyl hydroxypolychloropropoxychloropropyl - N,N - diethanolamino methylphosphonate having an analysis of 6.9% P and 6.9% Cl., and a hydroxyl equivalent weight of 110.

POLYURETHANE FOAMS

The following examples illustrate the use of my novel compounds in forming flame resistant polyurethane foamed products.

EXAMPLE 6

The following materials were mixed together at room temperature:

16.2 g. bis-(hydroxypolyethoxyethyl)-N,N-diethanolamino methylphosphonate (the compound prepared in Example 1)
13.0 g. trichloromonofluoromethane (Freon–11)
0.5 g. silicon surfactant (L–521)
0.2 g. dibutyl tin dilaurate
0.3 g. tetramethylguanidine
21.7 g. polyol (Selectrofoam 6406)

To this mixture was added 48.0 g. polymethyl polyphenylisocyanate and the resulting mixture was stirred rapidly. After approximately 20–30 seconds the mixture turned from a dark to a cream color and was quickly poured into a large container where a rapid expansion occurred. The foam hardened in about one minute and was found to be self extinguishing when ignited.

EXAMPLE 7

In a manner similar to Example 6 the following mixture was prepared:

21.4 g. bis-(hydroxypolychloropropoxychloropropyl)-N, N-diethanolamino methylphosphonate (the compound prepared in Example 4)
13.0 g. trichloromonofluoromethane (Freon–11)
0.5 g. silicon surfactant (L–521)
0.2 g. dibutyl tin dilaurate
0.5 g. tetramethylguanidine
17.0 g. polyol (Selectrofoam 6406)

To this mixture was added 47.4 g. of polymethyl polyphenyl isocyanate and the resulting composition rapidly stirred. After approximately 30 seconds the mixture turned from a dark to a cream color and was then rapidly poured into a larger container wherein it expanded and hardened. The foam was found to be self extinguishing when ignited.

EXAMPLE 8

In a manner similar to Example 6 the following was prepared:

22.2 g. hydroxychloropropoxychloropropyl hydroxypolypropoxypropyl - N,N - diethanolamino methylphosphonate (the compound prepared in Example 5)
16.8 g. polyol (Selectrofoam 6406)
13.0 g. trichloromonofluoromethane (Freon–11)
0.5 g. silicone surfactant (L–521)
0.2 g. dibutyl tin dilaurate
0.3 g. tetramethylguanidine To this mixture was added 47.0 g. of polymethyl polyphenyl isocyanate and the resulting mixture was rapidly stirred. After approximately 30 seconds the mixture turned to a light color and was then rapidly poured into a larger container and allowed to expand. A rigid, tough foam was formed which was self-extinguishing when ignited.

In the preceding examples both commercial polyol and the novel compounds herein disclosed were used as a source of hydroxyl groups. In the following example the compounds herein disclosed were the only source of hydroxyl groups.

EXAMPLE 9

In a manner similar to Example 6 the following were mixed together:

34.0 g. bis-(hydroxypolychloropropoxychloropropyl)-N, N-diethanolamino methylphosphonate (the compound of Example 3)
13.0 g. trichloromonofluoromethane (Freon–11)
0.5 g. silicone surfactant (L–521)
0.2 g. dibutyl tin dilaurate
0.5 g. tetramethylguanidine To this mixture was added 53.0 g. of polymethyl polyphenyl isocyanate and the mixture agitated vigorously. After approximately 30–40 seconds the mixture turned from a dark to a cream color and was then rapidly poured into a large container. The foam rose and hardened to form a flame resistant composition.

To test the relative flammability of the polyurethane foams of the preceding examples, several 2" x 6" x ½" test specimens were evaluated. These tests were carried out according to standard methods (ASTM Designation D 1692–59T issued 1959). For comparison purposes a polyurethane foam was made wherein no flame retardant such as the materials herein described was included. Polyurethane foams which were made containing the novel phosphorus compounds herein described were found to be self-extinguishing and extremely fire resistant as opposed to the control foams which burned freely.

In performing the foregoing experiments, ordinary commercial grade materials have been used with the exception of my new compounds. In formulating the urethane foams, I have limited the examples to the use of definitely identified polyols surfactants and foaming agents since it is often difficult to ascertain the exact composition of these commercial compositions.

The exact proportions and reactants necessary to produce the flame-resistant copolymers are not critical. Stoichiometric quantities can be readily calculated from the hydroxyl number of the polyol (or the amount of active hydrogen in the case of amino or carboxy groups) and the number of —NCO groups in the isocyanate. Generally speaking, however, an excess of isocyanate of 5–15% of the stoichiometric amount is used. For the purpose of flameproofing the final copolymer in accordance with the present invention, it is necessary to add enough of the dialkanylaminoalkylphosphonate to supply at least about 1½% P in the final copolymer with an upper limit of about 6%.

Having thus described the invention, I claim:

1. A flame-resistant polymer comprising the reaction product of an organic polyisocyanate and a novel bis-(hydroxypolyalkoxyalkyl) aminomethylphosphonate of the general formula:

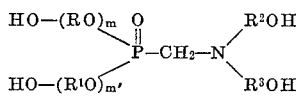

wherein R is selected from the group consisting of ethylene and substituted ethylene, said substituents selected from alkyl and haloalkyl, and $R^1$ is halo alkyl substituted ethylene, $R^2$ and $R^3$ are lower alkylene and $m$, $m'$ are integers of from 1 to 10, the total of which is at least 3, wherein said aminophosphonate is present in an amount sufficient to impart flame resistance.

2. A flame-resistant polymer comprising the reaction product of an organic polyisocyanate and an amount of bis-(hydroxypolychloropropoxychloropropyl)-N,N-diethanolamino methylphosphonate sufficient to provide at least about 1½% phosphorus in the final polymer.

3. A flame-resistant polymer comprising the reaction product of an organic polyisocyanate and an amount of hydroxypolychloropropoxychloropropyl hydroxypolypropoxypropyl - N,N - diethanolamino methylphosphonate sufficient to provide at least about 1½% phosphorus in the final polymer.

References Cited

UNITED STATES PATENTS

| 3,134,742 | 5/1964 | Wismer et al. | 260—2.5 |
| 3,294,710 | 12/1966 | Rosenberg et al. | 260—2.5 |
| 3,309,342 | 3/1967 | Friedman | 260—77.5 |

DONALD E. CZAJA, Primary Examiner

M. J. WELSH, Assistant Examiner

U.S. Cl. X.R.

260—2.5, 945, 970

UNITED STATES PATENT OFFICE
CERTIFICATE OF CORRECTION

Patent No. 3,539,536　　　　　　　　　　　　　　　　November 10,

Glenn R. Price

It is certified that error appears in the above identified patent and that said Letters Patent are hereby corrected as shown below:

Column 1, lines 20 to 23, the formula should appear as shown bel

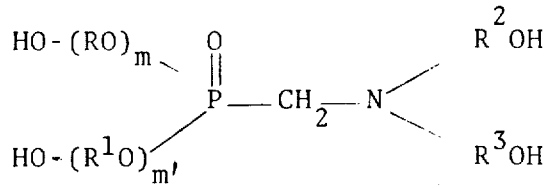

line 27, "$m^1$" should read -- m' --; line 35, "aminomethylphoephonate should read -- aminomethylphosphonates --; lines 63 to 67, the formu should appear as shown below:

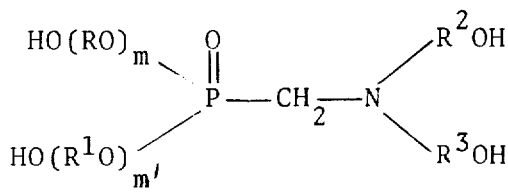

Column 2, lines 11 to 14, the formula should appear as shown below:

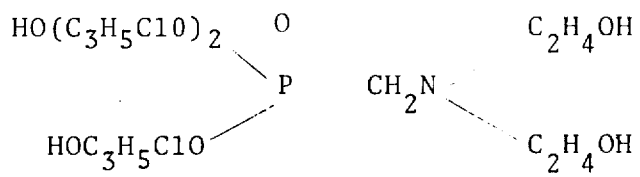

lines 31 to 33, the formula should appear as shown below:

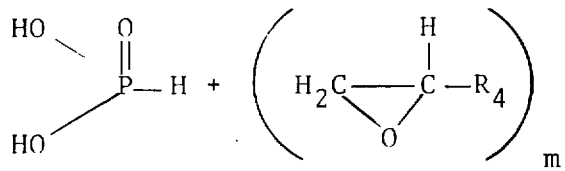

3,539,536
(2)

Column 3, line 16, "noval" should read -- novel --; lines 45 and 46, "46.0 grams (0.46 grams (0.40 mole)" should read -- 46.0 g (0.40 mole) --. Column 4, lines 13 and 14, "diethanelaminomethylphosphonate" should read -- diethanolaminomethylphosphonate --; lines 49 and 50, after "these" insert -- examples illustrate how one may control the chlorine --; line 58, "295.0 grams" should read -- 205.0 grams --; line 59, "495 grams" should read -- 405 grams --. Column 5, line 23, "295.0 grams" should read -- 205.0 grams --.

Signed and sealed this 27th day of April 1971.

(SEAL)
Attest:

EDWARD M. FLETCHER, JR.
Attesting Officer

WILLIAM E. SCHUYLER
Commissioner of Pate